United States Patent
Sonoda et al.

(10) Patent No.: US 11,384,204 B2
(45) Date of Patent: Jul. 12, 2022

(54) VARNISH FOR PHOTO ALIGNMENT FILM AND LIQUID CRYSTAL DISPLAY DEVICE

(71) Applicant: Japan Display Inc., Minato-ku (JP)

(72) Inventors: Hidehiro Sonoda, Tokyo (JP); Takenori Hirota, Tokyo (JP); Yasushi Tomioka, Tokyo (JP); Noboru Kunimatsu, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 17/164,973

(22) Filed: Feb. 2, 2021

(65) Prior Publication Data
US 2021/0155755 A1 May 27, 2021

Related U.S. Application Data

(63) Continuation of application No. 15/647,322, filed on Jul. 12, 2017, now Pat. No. 10,947,345.

(30) Foreign Application Priority Data

Jul. 19, 2016 (JP) .................. 2016-141379

(51) Int. Cl.
| | | |
|---|---|---|
| *C08G 73/10* | (2006.01) | |
| *G02F 1/1337* | (2006.01) | |
| *C09D 179/08* | (2006.01) | |
| *G02F 1/1333* | (2006.01) | |

(52) U.S. Cl.
CPC ..... *C08G 73/1067* (2013.01); *C08G 73/1014* (2013.01); *C08G 73/1071* (2013.01); *C08G 73/1078* (2013.01); *C09D 179/08* (2013.01); *G02F 1/133711* (2013.01); *G02F 1/133723* (2013.01); *G02F 1/133788* (2013.01); *G02F 1/133354* (2021.01); *G02F 1/133397* (2021.01)

(58) Field of Classification Search
CPC ............ C08G 73/1067; C08G 73/1014; C08G 73/1078; C08G 73/1071; C08G 73/1028; C08G 73/1085; C09D 179/08; G02F 1/133788; G02F 1/133723; G02F 1/133711; G02F 2001/133397; G02F 2001/133354
USPC ........................................ 528/353; 428/1.26
See application file for complete search history.

(56) References Cited

U.S. PATENT DOCUMENTS

| | | | |
|---|---|---|---|
| 5,756,650 A | 5/1998 | Kawamonzen et al. | |
| 6,316,574 B1 * | 11/2001 | Tanioka | G02F 1/133723 528/229 |
| 6,746,730 B1 | 6/2004 | Tanioka | |
| 6,949,281 B1 | 9/2005 | Tanioka | |
| 8,895,230 B2 | 11/2014 | Krishnamurthy | |
| 9,334,368 B2 | 5/2016 | Hirano | |
| 9,334,369 B2 | 5/2016 | Cheng | |
| 10,696,808 B2 | 6/2020 | Nukada | |
| 10,947,345 B2 * | 3/2021 | Sonoda | G02F 1/133711 |
| 2013/0270487 A1 | 10/2013 | Oku et al. | |
| 2015/0109569 A1 | 4/2015 | Kunimatsu et al. | |
| 2015/0224548 A1 | 8/2015 | Shimada | |
| 2016/0085119 A1 | 3/2016 | Hirota et al. | |
| 2016/0103368 A1 | 4/2016 | Imanishi | |
| 2016/0103369 A1 | 4/2016 | Imanishi | |
| 2017/0137667 A1 | 5/2017 | Sonoda et al. | |
| 2019/0062503 A1 | 2/2019 | Komatsu | |
| 2019/0322807 A1 | 10/2019 | Watanabe | |

FOREIGN PATENT DOCUMENTS

| | | |
|---|---|---|
| CN | 102893209 A | 1/2013 |
| CN | 103180390 A | 6/2013 |
| JP | 9-302225 | 11/1997 |
| JP | 2006-56956 | 3/2006 |
| JP | 2015-82015 | 4/2015 |
| JP | 2015-148747 A | 8/2015 |
| JP | 2016-66053 A | 4/2016 |
| JP | 2017-90781 | 5/2017 |
| JP | 201 81 73545 A | 11/2018 |
| TW | 201343786 A | 11/2013 |
| WO | WO 2012/176822 A1 | 12/2012 |
| WO | WO 2013/054858 A1 | 4/2013 |
| WO | WO 2016/035593 A1 | 3/2016 |
| WO | WO 2016/104514 A1 | 6/2016 |

OTHER PUBLICATIONS

Combined Chinese Office Action and Search Report dated May 20, 2020 in corresponding Chinese Patent Application No. 2017105895191 (English Translation only), 10 pages.
Office Action dated Jun. 23, 2020 in corresponding Japanese Patent Application No. 2016-141379 (English Translation only), 5 pages.
Office Action dated Nov. 17, 2020 in Japanese Application No. 2016-141379.

\* cited by examiner

*Primary Examiner* — Douglas J McGinty
(74) *Attorney, Agent, or Firm* — Oblon, McClelland, Maier & Neustadt, L.L.P.

(57) ABSTRACT

According to one embodiment, a varnish for a photo alignment film includes an imidization promotor and a first polyamic acid-based compound in an organic solvent. The first polyamic acid-based compound is a polyamic acid or a polyamic acid ester. The imidization promotor has skeleton containing no primary amino group and no secondary amino group. The first polyamic acid-based compound has terminal skeletons containing no primary amino group.

9 Claims, 2 Drawing Sheets

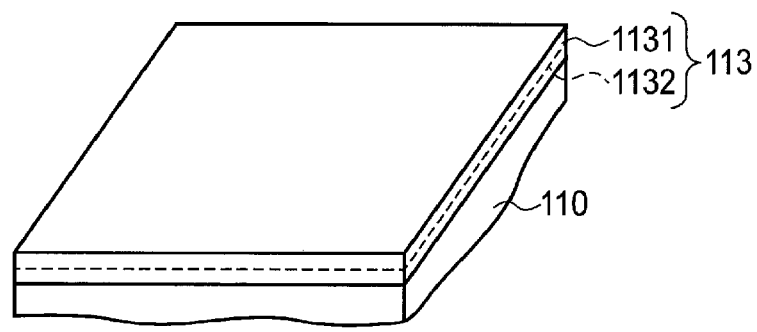
F I G. 3
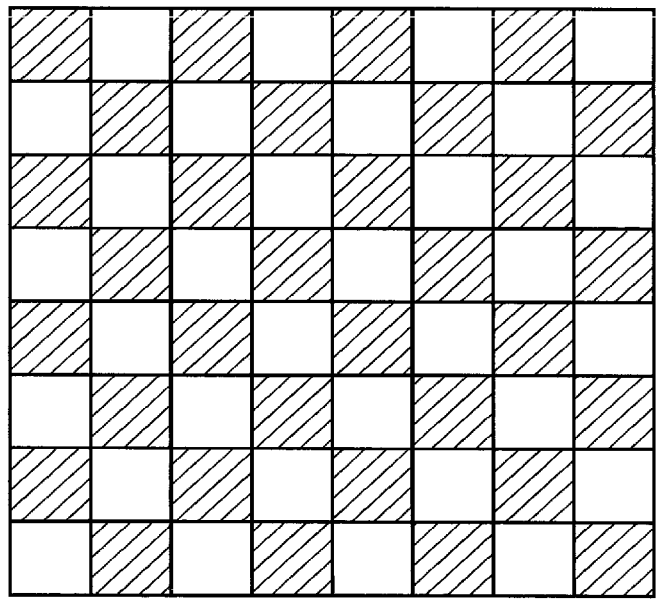
F I G. 4

VARNISH FOR PHOTO ALIGNMENT FILM AND LIQUID CRYSTAL DISPLAY DEVICE

CROSS-REFERENCE TO RELATED APPLICATIONS

This application is a continuation of and claims the benefit of priority under 35 U.S.C. § 120 from U.S. application Ser. No. 15/647,322 filed Jul. 12, 2017, and claims the benefit of priority under 35 U.S.C. § 119 from Japanese Patent Application No. 2016-141379 filed Jul. 19, 2016, the entire contents of each of which are incorporated herein by reference.

FIELD

Embodiments described herein relate generally to a varnish for a photo alignment film and a liquid crystal display device.

BACKGROUND

Liquid crystal display devices comprise an array substrate provided with, for example, pixel electrodes and thin-film transistors (TFTs) arranged in a matrix and a counter-substrate arranged apart from and opposite to the array substrate and provided with, for example, color filters, formed thereon. Liquid crystal is sealed between the array substrate and the counter-substrate.

The liquid crystal is aligned by alignment films disposed on the array substrate and the counter-substrate, respectively. Polyimide films are frequently used as the alignment films. The polyimide films are obtained by baking polyamic acid at a high temperature of 230° C. or higher. But, in most of the cases, polyimide films obtained by baking at high temperature have deteriorated transmissivity due to coloring of film. As a solution to this, such a technique is employed that polyamic acid is imidized in the presence of an amine-based imidization promotor. Imidization using an imidization promotor can be carried out at relatively low temperature, and therefore substantially no coloring of polyimide occurs.

Recently, a photo-alignment technique, which can impart the alignment control capability to polyimide films in a non-contact manner, has been adopted, in addition to rubbing treatment. The photo-alignment technique comprises irradiating the polyimide film with ultraviolet (UV) light having a short wavelength of 254 to 365 nm to achieve the alignment. In the polyimide film irradiated with the polarized light, some main chains of the polyimide molecules are cut in a direction parallel to the direction of polarization, and the polyimide film is given uniaxial anisotropy in a direction perpendicular to the direction of polarization. Liquid crystal molecules are aligned along the remaining main chains of the polyimide molecules which have not been cut, and thus are kept long and linearly extend.

BRIEF DESCRIPTION OF THE DRAWINGS

FIG. 3 is a perspective view illustrating a structure of an alignment film having a double-layer structure according to one embodiment.

FIG. 4 is a view illustrating a pattern for inspection for a DC afterimage.

DETAILED DESCRIPTION

Figure 1:
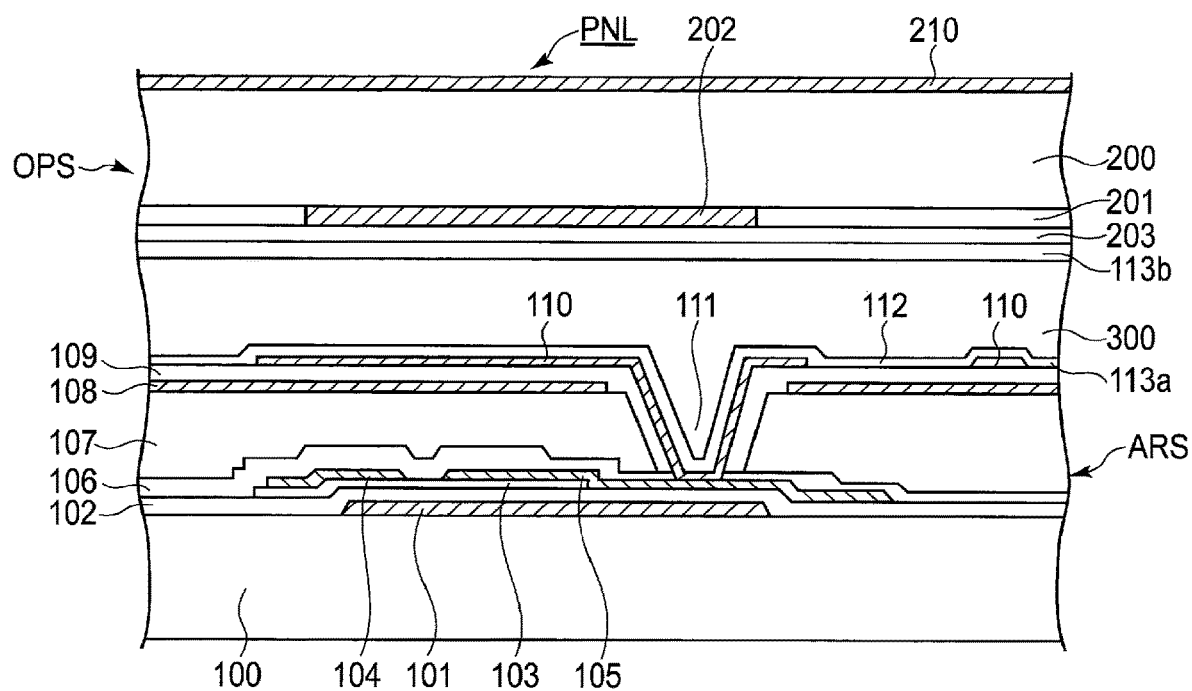
FIG. 1 is a schematic cross-sectional view illustrating part of a display panel of a liquid crystal display device according to one embodiment.

In general, according to first embodiment, there is provided a varnish for a photo alignment film comprising an imidization promotor and a first polyamic acid-based compound in an organic solvent, the first polyamic acid-based compound being a polyamic acid or a polyamic acid ester, wherein the imidization promotor has skeleton containing no primary amino group and no secondary amino group, and the first polyamic acid-based compound has terminal skeletons containing no primary amino group.

According to second embodiment, there is provided a varnish for a photo alignment film comprising a first polyamic acid-based compound in an organic solvent, the first polyamic acid-based compound being a polyamic acid or a polyamic acid ester, wherein the first polyamic acid-based compound has terminal skeletons containing no primary amino group, and also a diamine skeleton represented by Formula (7) below:

(7)

where L is an aromatic compound group, and I) $Y^5$ is an amino group containing an organic group which may leave by heat, $Y^6$ is H or an amino group containing an organic group which may leave by heat, or II) $Y^5$ and $Y^6$ are bonded together to form a cyclic group containing nitrogen.

The present inventors have confirmed that when a liquid crystal display device incorporating a polyimide alignment film having been subjected to photo-alignment processing (photo alignment polyimide film) is turned on and an image is displayed, the photo alignment polyimide film becomes excited by the light emitted from the backlight as the lighting time of the backlight proceeds, producing a photoelectromotive force, as a result of which charge is accumulated in the photo alignment polyimide film, leading to an afterimage (DC afterimage).

In recent years, alignment films have been required to have a higher resistance in order to improve a voltage holding ratio of a pixel electrode. However, more recently, it has been found that only in the case where a high-resistance alignment film is subjected to photo-alignment process, a specific DC afterimage phenomenon occurs. In this phenomenon, when the light of a liquid crystal display device is continuously turned on, a DC voltage is created by photo-charge of the alignment film in liquid crystal cells, and the afterimage does not disappear even when the application of a voltage to pixel electrodes is stopped. As a result of the present inventors' investigation, it has been confirmed that before and after the photo-alignment processing, in which short-wavelength UV irradiation is used, an absorption wavelength of the alignment film changes. More specifically, as a result of the alignment processing noted above, the alignment film became to slightly absorb UV light emitted of 450 nm or less within the emission wavelength of the backlight. The inventors investigated its cause in detail and conjectured that the cause is the primary amines present at the terminals of the chemical structure of the polyimide. It is inferred that the primary amines are displaced in the photo-alignment process, leading to the change in the absorption wavelength of the polyimide film, though it is uncertain exactly why so. This phenomenon has been confirmed to occur also in a polyimide film obtained by imidization using an imidization promotor having a primary or secondary amine skeleton.

The present inventors have made intensive studies on the DC afterimage of the polyimide film imidized using the amine-based promotor. As a result, they found a technique of preventing DC afterimage completely from occurring or eliminating it to disappear in a short time even if it occurs by: 1) letting the imidization promotor to use include a skeleton other than a primary amino group and a secondary amino group or not using an imidization promotor, and 2) letting the polyimide contain groups other than a primary amino group at both terminals thereof. Making the polyimide to have groups other than primary amino groups at its both terminals can be achieved making a polyamic acid or a polyamic acid ester (usually provided in the form of varnish), which is a precursor of the polyimide, to have groups other than primary amino groups at its both terminals.

Thus, such a vanish for forming an photo alignment film can be provided, that DC afterimage can be prevented from occurring in a liquid crystal display device, or even DC afterimage occurs, it disappear in a short time.

First Embodiment

A varnish for a photo alignment film according to the first embodiment includes an imidization promotor and a first polyamic acid-based compound in an organic solvent. The first polyamic acid-based compound is a polyamic acid or a polyamic acid ester. The imidization promotor has skeleton containing no primary amino group and no secondary amino group. The first polyamic acid-based compound has terminal skeletons containing no primary amino group.

In some embodiments, a varnish for a photo alignment film according to the first embodiment comprising an imidization promotor and a first polyamic acid-based compound in an organic solvent, the first polyamic acid-based compound being a polyamic acid or a polyamic acid ester, wherein the imidization promotor has skeleton containing no primary amino group and no secondary amino group, and the first polyamic acid-based compound has terminal skeletons containing no primary amino group.

[Imidization Promotor]

An imidization promotor promotes the dehydration and cyclization reaction to the first polyamic acid-based compound.

In some embodiments, the imidization promotor is a pyridine-based compound, a quinoline-based compound, an isoquinoline-based compound, an imidazole-based compound, a benzimidazole-based compound or a tertiary amine.

The pyridine-based compound is a compound which has a pyridine skeleton, whereas the quinoline-based compound, isoquinoline-based compound, imidazole-based compound and benzimidazole-based compound are compounds which have a quinoline skeleton, an isoquinoline skeleton, an imidazole skeleton and a benzimidazole skeleton, respectively.

The tertiary amine is, for example, an aliphatic tertiary amine, an aromatic tertiary amine, or a heterocyclic tertiary amine, or a derivative such as an alkyl-substituted compound.

Examples of the aliphatic tertiary amine are trimethylamine, triethylamine, dimethylethylamine, diethylmethylamine, tripropylamine, tributylamine, tripentylamin, tricyclopentylamine, trihexylamine, benzyldimethylamine triethanolamine, etc.

An example of the aromatic tertiary amine is N,N-dimethylaniline.

Examples of the heterocyclic tertiary amine are pyridine, β-picoline, quinoline, isoquinoline, dipyridine, diquinoline, pyridazine, pyrimidine, pyrazine, phthalazine, quinoxaline, quinazoline, cinnoline, naphthyridine, acridine, phenantolidine, benzoquinoline, benzoisoquinoline, benzocinnoline, benzophthalazine, benzoquinoxaline, benzoquinazoline, phenanthroline, phenazine, triazine, tetrazine, pteridine, oxazole, benzoxazole, isoxazole, benzoisoxazole, thiazole, benzothiazole, oxadiazole, thiadiazole, benzoisoquinolizine, hexamethylenetetramine, N,N-dimethyl-4-aminopyridine, 4-hydroxypyridine etc.

In some embodiments, the imidization promotor should preferably be a such as N,N-dimethylaniline, pyridine, β-picoline, quinoline, isoquinoline or N,N-dimethyl-4-aminopyridine, or a derivative thereof. The derivative should preferably be an alkyl-substituted compound.

In some embodiments, the imidization promotor comprises an amine-reactive skeleton.

The amine-reactive skeleton includes a halogen group, a diazo group, a carboxyl group, a hydroxyl group, an isocyanate group or an acid anhydride skeleton.

Examples of the imidization promotor having an amine-reactive skeleton are dimethylglycine, picolinic acid, nicotinic acid and 5-butylpicolinic acid.

In the imidization, the amine-reactive skeleton reacts with a primary amine which may exist at sites other than both terminals of the first polyamic acid-based compound and a secondary amine which may exist in the first polyamic acid-based compound, to produce amide. Thus, DC afterimage which occurs due to the primary and secondary amines can be substantially eliminated more reliably.

In some embodiments, the imidization promotor has a molecular weight of 130 or more. An imidization promotor having a molecular weight of 130 or more, which exists in a photo-alignment polyimide film is not able to easily respond to a general liquid crystal drive (of 1 Hz to 120 Hz) because of its ion weight. Therefore, it becomes possible to slow down the accumulation velocity of ions to a specific part in the display device, which may be caused by long drive, and thus the time until nonuniformity in display occurs and the life of the display device can be prolonged.

Note that the content of the imidization promotor in the varnish for photo alignment films should preferably be 5% by mass or more, and more preferably 10% by mass or more.

[First Polyamic Acid-Based Compound]

In some embodiments, the first polyamic acid-based compound has a structural unit (repeating unit) represented by Formula (1) below:

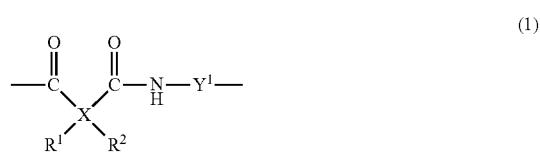

where X is a cyclic group, each of $R^1$ and $R^2$ is independently —COOH or —COOR where R is an alkyl group, and $Y^1$ is an organic group.

In one embodiment, X is an alicyclic group, for example, a substituted or unsubstituted cyclobutane group. In another embodiment, X is a benzene ring or a benzene ring-containing group, wherein the benzene ring may be substituted with an alkyl group or the like. Preferably, X is the alicyclic group.

In some embodiments, the first polyamic acid-based compound has a diamine skeleton represented by Formula (2) below:

 (2)

where M is an organic group, for example, a cyclic group-containing group. In some embodiments, M is $Ar^0$ or $Ar^1$—Z—$Ar^2$, where $Ar^0$ is an aromatic group, each of $Ar^1$ and $Ar^2$ is independently an aromatic group, and Z is an organic group containing no primary amino group and no secondary amino group. An example of the aromatic group represented by $Ar^0$, $Ar^1$ or $Ar^2$ is a benzene ring or a benzene ring-containing group. Alternatively, Z is constituted by oxygen, nitrogen, sulfur, carbon or hydrogen, or a combination of two or more of them. Z contains no hydroxyl group, no thiol group and no amino group other than tertiary amino group, i.e., no —NH nor >NH.

In some embodiments, the terminal skeletons of the first polyamic acid-based compound each comprise an imide skeleton, an amide skeleton, a urea skeleton, a tertiary amino skeleton, an azo bond or a carboxyl group.

In some embodiments, both terminal skeletons of the first polyamic acid-based compound are represented by Formula (3) below:

 (3)

where $Y^2$ is H, S or an organic group, and $Y^3$ is an aliphatic group or an aromatic group; or $Y^2$ and $Y^3$ are bonded together to form a cyclic group, for example, imide; or Formula (4) below:

 (4)

where $Y^4$ is an organic group; or Formula (5) below:

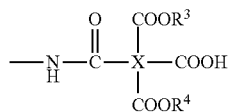 (5)

where X is as defined above, and each of $R^3$ and $R^4$ is independently hydrogen or an alkyl group.

The polyamic acid can be produced by reacting a tetracarboxylic dianhydride with a diamine by an ordinary method.

The tetracarboxylic dianhydride can be represented by Formula (A) below:

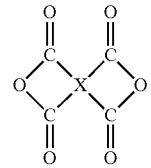 (A)

where X is a cyclic group as defined above with respect to Formula (1) above.

The tetracarboxylic dianhydride having a substituted or unsubstituted cyclobutane group as X can be represented by Formula (B) below:

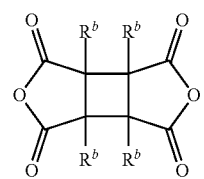 (B)

where each $R^b$ is independently hydrogen or an alkyl group. An example of the alkyl group is an alkyl group having one to six carbon atoms. Particularly preferably, the alkyl group is methyl group.

An example of the tetracarboxylic dianhydride having a benzene ring as X is pyromellitic acid.

Preferably, the tetracarboxylic dianhydride is the one represented by Formula (B) above.

[Diamine]

The diamine to be reacted with the above tetracarboxylic dianhydride is an organic compound having two primary amino groups. The diamine can be represented by Formula (C):

 (C)

where M is as defined with respect to Formula (2) above.

The diamine represented by Formula (C) includes an alicyclic diamine, a heterocyclic diamine, an aliphatic diamine and an aromatic diamine.

Examples of the alicyclic diamine are 1,3-diaminocyclohexane, 1,4-diaminocyclohexane, 4,4'-diaminodicyclohexylmethane, 4,4'-diamino-3,3'-dimethyldicyclohexylamine, isophoronediamine, etc.

Examples of the heterocyclic diamine are 2,6-diaminopyridine, 2,4-diaminopyridine, 2,4-diamino-1,3,5-triazine, 2,7-diaminodibenzofuran, 3,6-diaminocarbazole, 2,4-diamino-6-isopropyl-1,3,5-triazine, 2,5-bis(4-aminophenyl)-1,3,4-oxadiazole, etc.

Examples of the aliphatic diamine are 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylheptane, 1,12-diaminododecane, 1,18-diaminooctadecane, 1,2-bis(3-aminopropoxy)ethane, etc.

Examples of the aromatic diamine are o-phenylenediamine, m-phenylenediamine, p-phenylenediamine, 2,4-diaminotoluene, 2,5-diaminotoluene, 3,5-diaminotoluene, 1,4-diamino-2-methoxybenzene, 2,5-diamino-p-xylene, 1,3- diamino-4-chlorobenzene, 3,5-diaminobenzoic acid, 1,4-diamino-2, 5-dichlorobenzene, 4,4'-diamino-1,2-diphenylethane, 4,4'-diamino-2,2'-dimethylbibenzyl, 4,4'-diaminodiphenylmethane, 3,3'-diaminodiphenylmethane, 3,4'-diaminodiphenylmethane, 4,4'-diamino-3,3'-dimethyldiphenylmethane, 2,2'-diaminostilbene, 4,4'-diaminostilbene, 4,4'-diaminodiphenyl ether, 3,4'-diaminodiphenyl ether, 4,4'-diaminodiphenyl sulfide, 4,4'-diaminodiphenyl sulfone, 3,3'-diaminodiphenyl sulfone, 4,4'-diaminobenzophenone, 1,3-bis(3-aminophenoxy)benzene, 1,3-bis(4-aminophenoxy)benzene, 1,4-bis(4-aminophenoxy)benzene, 3,5-bis(4-aminophenoxy)benzoic acid, 4,4'-bis(4-aminophenoxy) bibenzyl, 2,2-bis[(4-aminophenoxy)methyl]propane, 2,2-bis[4-(4-aminophenoxy)phenyl]hexafluoropropane, 2,2-bis[4-(4-aminophenoxy)phenyl]propane, bis[4-(3-aminophenoxy)phenyl]ulfone, bis[4-(4-aminophenoxy)phenyl]sulfone, 1,1-bis(4-aminophenyl)cyclohexane, α,α'-bis(4-aminophenyl)-1,4-diisopropylbenzene, 9,9-bis(4-aminophenyl)fluorene, 2,2-bis(3-aminophenyl)hexafluoropropane, 2,2-bis(4-aminophenyl) hexafluoropropane, 4,4'-diaminodiphenylamine, 2,4-diaminodiphenylamine, 1,8-diaminonaphthalene, 1,5-diaminonaphthalene, 1,5-diaminoanthraquinone, 1,3-diaminopyrene, 1,6-diaminopyrene, 1,8-diaminopyrene, 2,7-diaminofluorene, 1,3-bis(4-aminophenyl)tetramethyl-disiloxane, benzidine, 2,2'-dimethylbenzidine, 1,2-bis(4-aminophenyl)ethane, 1,3-bis(4-aminophenyl)propane, 1,4-bis(4-aminophenyl)butane, 1,5-bis(4-aminophenyl)pentane, 1,6-bis(4-aminophenyl)hexane, 1,7-bis(4-aminophenyl)heptane, 1,8-bis(4-aminophenyl)octane, 1,9-bis(4-aminophenyl)nonane, 1,10-bis(4-aminophenyl)decane, 1,3-bis(4-aminophenoxy)propane, 1,4-bis(4-aminophenoxy)butane, 1,5-bis(4-aminophenoxy)pentane, 1,6-bis(4-aminophenoxy)hexane, 1,7-bis(4-aminophenoxy)heptane, 1,8-bis(4-aminophenoxy)octane, 1,9-bis(4-aminophenoxy)nonane, 1,10-bis(4-aminophenoxy)decane, di(4-aminophenyl)propane-1,3-dioate, di(4-aminophenyl)butane-1,4-dioate, di(4-aminophenyl)pentane-1,5-dioate, di(4-aminophenyl)hexane-1,6-dioate, di(4-aminophenyl)heptane-1,7-dioate, di(4-aminophenyl)octane-1,8-dioate, di(4-aminophenyl)nonane-1,9-dioate, di(4-aminophenyl)decane-1,10-dioate, 1,3-bis[4-(4-aminophenoxy)phenoxy]propane, 1,4-bis[4-(4-aminophenoxy)phenoxy]butane, 1,5-bis[4-(4-aminophenoxy)phenoxy]pentane, 1,6-bis[4-(4-ami- nophenoxy)phenoxy]hexane, 1,7-bis[4-(4-aminophenoxy)phenoxy]heptane, 1,8-bis[4-(4-aminophenoxy)phenoxy]octane, 1,9-bis[4-(4-aminophenoxy)phenoxy]nonane, 1,10-bis[4-(4-aminophenoxy)phenoxy]decane, etc. Further examples of the aromatic diamine are listed below (in the further examples below, n denotes an integer of 1 to 10):

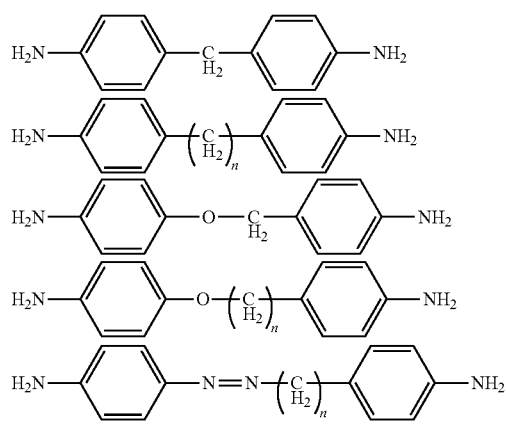

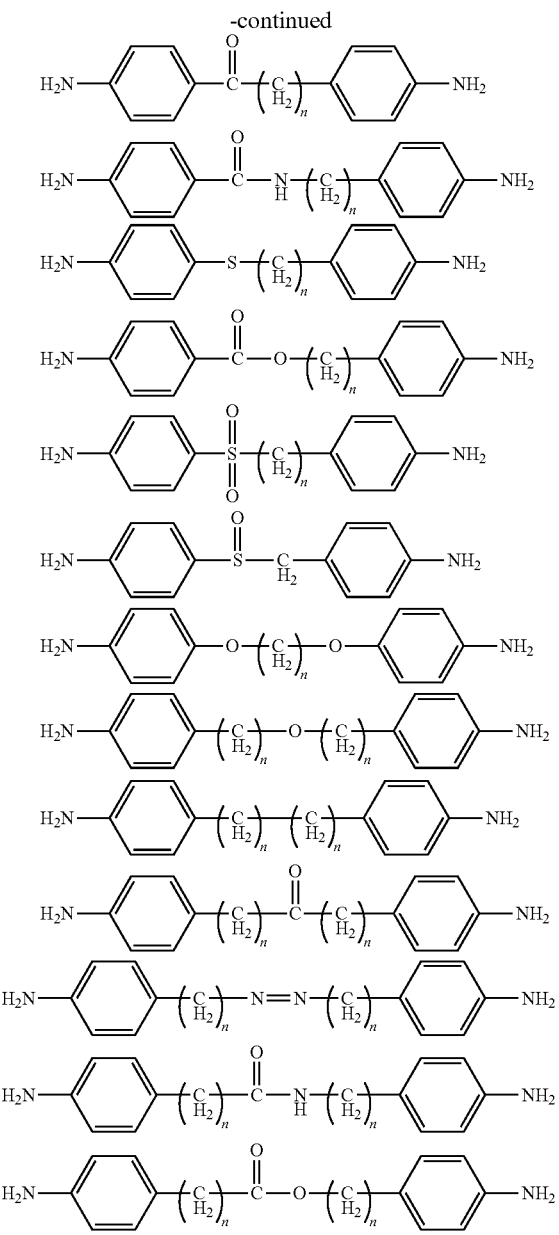

The aromatic diamine can be represented by Formula (D) or (E) below:

$$H_2N-Ar^0-NH_2 \quad (D)$$

$$H_2N-Ar^1-Z-Ar^2-NH_2 \quad (E)$$

where $Ar^0$, $Ar^1$, $Ar^2$ and Z are as defined with respect to Formula (2) above. An alignment film formed using the diamine represented by Formula (D) has a high photo-alignability, and is preferably used to produce a second polyamic acid-based compound described below. An alignment film formed using the diamine represented by Formula (E) does not contain thiol group or hydroxyl group, and thus is not greatly influenced by a hydrogen bond. Accordingly, its resistance tends to become high. Also, this diamine does not contain an amino group other than a tertiary amine in Z, i.e., does not contain —NH or >NH in Z, and DC afterimages can be prevented from generating. Accordingly, it is preferable that the diamine of Formula (E) be used to produce the first polyamic acid-based compound. It should be noted that an amide bond is distinguished from a secondary amino group, since their chemical properties are different from each other. That is, Z may be an organic group which forms an amide bond.

Note that a polyamic acid ester having —COOR can be produced by reacting, for example, N,N-dimethylformamide dialkyl acetal with the polyamic acid above. Alternatively, a polyamic acid ester can also be produced by the method disclosed in JP 2000-273172 A.

[Terminal Skeleton of Polyamic Acid-Based Compound]

In some embodiments, preferably, the first polyamic acid-based compound has terminal skeletons represented by Formula (3), (4) or (5).

In the reaction of the tetracarboxylic dianhydride and the diamine, when the diamine is used in an amount slightly larger than the amount of the tetracarboxylic dianhydride (for example, in a molar amount 1.1 to 1.5 times larger than the molar amount of the tetracarboxylic dianhydride), a polyamic acid having primary amino groups at its both terminals, or a polyamic acid having primary amines as the terminal skeletons, is produced.

The first polyamic acid-based compound noted above can be obtained by chemically modifying the terminal primary amino groups of the polyamic acid or the polyamic acid ester, which has the primary amino groups at its both terminals. This chemical modification is a capping of the primary amino groups.

A method for chemically modifying a terminal primary amino group includes amidation. As a capping agent (amidating agent) used for this purpose, a compound having one halogenated carbonyl group in the molecule, i.e. a monofunctional acid halide, can be used. The halide includes chloride, bromide and fluoride. Examples of the monofunctional acid halide include benzoyl chloride, acetyl chloride, propionyl chloride, acryloyl chloride, methacryloyl chloride and tosyl chloride.

Furthermore, as another capping agent which achieves the amidation, a compound having one acid anhydride, i.e., a monofunctional acid anhydride, may be used. Examples of the monofunctional acid anhydride are phthalic anhydride, maleic anhydride, succinic anhydride, itaconic anhydride, trimellitic anhydride, 1,2,4-cyclohexanetricarboxylic-1,2-anhydrid, cyclohexene-1,2-dicarboxylic anhydride, etc. In the case where the terminal primary groups are chemically modified with these compounds, ordinarily, the terminals are converted into polyamic acids. Thereafter, the resulting compound is formed into a film, and baked to be imidized.

Furthermore, for amidation, esterification into amic acid esters may be used. To convert the terminals into amic acid esters, it suffices that an amino-reactive group such as carboxyl group or an acid halide (halogenated carbonyl group) and a known aromatic compound having an ester skeleton are used as capping agents. Also, the conversion of the terminals into amic acid esters can be effected by reacting the compound having its terminals converted into amic acid by the above method with, for example, N,N-dimethylformamide dialkyl acetal. In the case where the terminal primary amino groups are chemically modified with these compounds, ordinarily, the terminals become polyamic acid esters. Thereafter, the resulting compound is formed into a film, and baked to be imidized.

Also, the terminals may be in imidized state. In order to obtain the imidized terminals, it suffices that the above capped compound having the terminals converted into polyamic acid or polyamic acid ester is heated to be dehydration-condensed.

It should be noted that a chemical modification other than amidation and imidization may be applied, for example, azotization, ureation or tertiary amination may be applied.

For azotization, a diazonium salt-based diazo coupling agent can be used as a capping agent (azotization agent). For ureation, an isocyanate-based compound can be used as a capping agent. Examples of the isocyanate are phenyl isocyanate, naphthyl isocyanate, etc. For tertiary amination, a compound having a halogen group (especially, chlorine) or hydroxyl group can be used as a capping agent (tertiary amination agent). It should be noted that substances other than the above capping agents can be used for the azotization, ureation or tertiary amination.

In another embodiment, a polyamic acid-based compound having terminal skeletons not containing a primary amino group can be produced by using, in the reaction of the tetracarboxylic dianhydride and the diamine note above, the tetracarboxylic dianhydride in an amount larger than the amount of the diamine (for example, in a molar amount 1.1 to 1.5 times larger than the amount of the diamine). This reaction produces a polyamic acid having carboxyl groups at its terminals.

In the case where the varnish contains two or more polyamic acid-based compounds, it is preferable that the total amount of the polyamic acid-based compounds each having carboxyl groups at the both terminals occupy 80% by mass or more, more preferably 90% by mass or more of the sum of the total amount of the polyamic acid-based compounds.

[Acid Skeleton]

As is clear from the above explanation, the first polyamic acid-based compound having groups other than primary amino groups at its both terminals can have an acid skeleton represented by Formula (6) below:

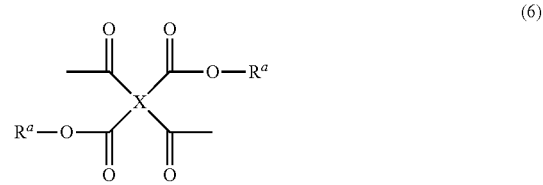

(6)

where X is as described above with respect to Formula (1) above.

The acid skeleton represented by the formula (6) includes acid skeletons represented by Formulas (6-1) and (6-2) below:

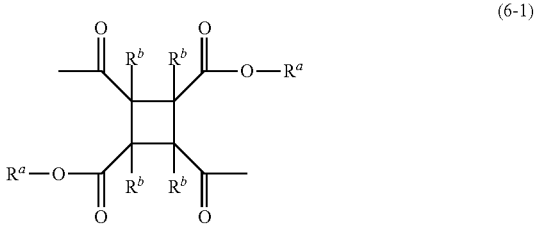

(6-1)

-continued

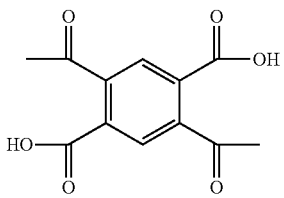

(6-2)

In Formula (6-1), $R^a$ is an alkyl group, for example, an alkyl group having 1 to 6 carbon atoms, and $R^b$ is hydrogen or an alkyl group as defined with respect to Formula (B) above.

The amine skeleton is as described above.

Furthermore, as is clear from the above, the first polyamic acid-based compound can have the structural unit (repeating unit) represented by Formula (1) above, and its terminal skeletons can comprise an imide skeleton, an amide skeleton, a urea skeleton, a tertiary amino skeleton, an azo bond or a carboxyl group. The structural unit represented by Formula (1) includes a structural unit represented by Formulas (1-1) or (1-2) below:

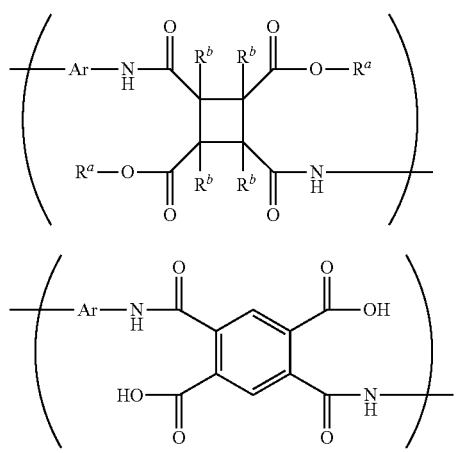

(1-1)

(1-2)

In Formulas (1-1) and (1-2), Ar is $Ar^0$ or $Ar^1$—Z—$Ar^2$ as defined with respect to Formula (2) above. In Formula (1-1), $R^a$ and $R^b$ are as defined with respect to Formula (6-1) above. Z is as defined with respect to Formula (2) above.

Second Embodiment

As described above, a requirement for the imidization promotor not to substantially produce DC afterimage is to avoid the imidization promotor from having skeletons of a primary amino group and a secondary amino group. This can be ultimately achieved by not using an imidization promotor substantially. However, without an imidization promotor, imidization cannot be promoted, and therefore the first polyamic acid-based compound (having terminal skeletons containing no primary amino group) is incorporated with a skeleton which can promote imidization.

That is, a varnish for a photo alignment film according to the second embodiment comprising a first polyamic acid-based compound in an organic solvent, the first polyamic acid-based compound being a polyamic acid or a polyamic acid ester, wherein the first polyamic acid-based compound has terminal skeletons containing no primary amino group, and also a diamine skeleton represented by Formula (7) below:

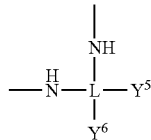

(7)

where L is an aromatic compound group, and I) $Y^5$ is an amino group containing an organic group which may leave by heat, $Y^6$ is H or an amino group containing an organic group which may leave by heat, or II) $Y^5$ and $Y^6$ are bonded together to form a cyclic group containing nitrogen.

The varnish according to the second embodiment further comprises an imidization promotor, an amount of the imidization promotor being less than 1.0% by mass based on an amount of the first polyamic acid-based compound.

The diamine skeleton represented by Formula (7) contains a diamine skeleton is represented by Formula (8) below:

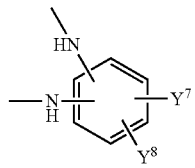

(8)

where $Y^4$ is a —N(H)A group, A being an amino group containing an organic group which may leave by heat, and $Y^5$ is H or a —N(H)A group, amino groups or —NH— groups being located at a meta position or para position with respect to each other, and $Y^4$ and $Y^5$ are located at ortho positions to one amino group or —NH— group.

The first polyamic acid-based compound having a diamine skeleton represented by Formula (7), has an acid skeleton represented by Formula (9) below:

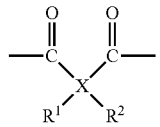

(9)

where X is a cyclic group as defined in Formula (1) above, each of $R^1$ and $R^2$ is independently —COOH or —COOR where R is an alkyl group.

Less than the 1.0% by mass of imidization promotor means, for example, that an amount of the imidization promotor being less than 1.0% by mass based on an amount of the first polyamic acid-based compound and this amount is a quantity which does not substantially exhibit the function of promoting imidization.

In some embodiments, the content of the imidization promotor in the organic solvent is less than 1.0% by mass, preferably, less than 0.1% by mass, and more preferably, 0% by mass.

The first polyamic acid-based compound contained in the varnish for photo alignment films according to the second aspect can be produced by using as a diamine which derives a diamine skeleton represented by Formula (7) (including Formula (8)) as the diamene in the production of the first polyamic acid-based compound contained in the varnish for photo alignment films according to the first aspect. Such a diamine includes an aromatic diamine represented by Formula (F) or (G) below.

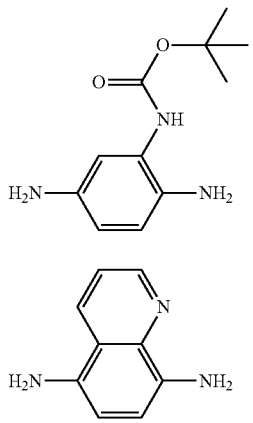

The polyamic acid-based compound obtained by reacting a diamine represented by Formula (F) or (G) with tetracarboxylic dianhydride by an ordinary method comprises an amine site having an imidization promoting function in a skeleton thereof.

The polyamic acid-based compound obtained by reacting a diamine of Formula (F) with tetracarboxylic dianhydride by the ordinary method forms an imidazole skeleton as a protective group (tert-butoxycarbonyl group) leaves by heating at the time of baking for imidization, thus promoting the imidization.

The reaction for forming an imidazole skeleton is expressed by Scheme (I) below:

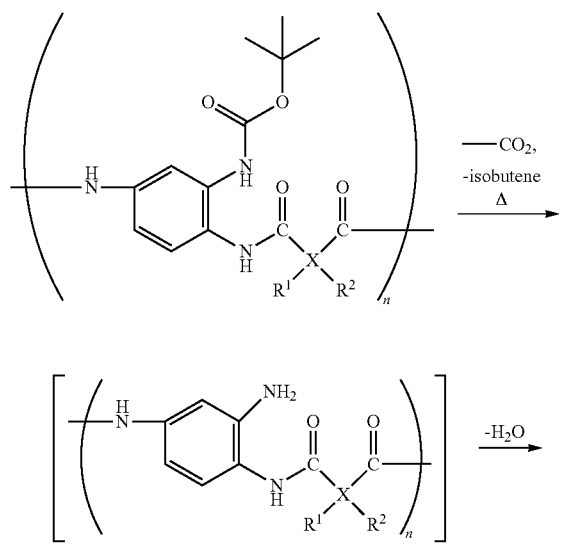

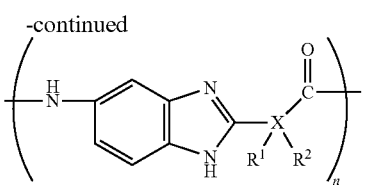

where X is a cyclic group as defined in Formula (1) above, each of $R^1$ and $R^2$ is independently —COOH or —COOR where R is an alkyl group as defined in Formula (1) above.

In some embodiments, the varnish for a photo alignment film according to the second contains a first polyamic acid-based compound which is a polyamic acid or a polymide acid ester in an organic solvent. Further, the content of the imidization promotor is less than 1.0% by mass, and the first polyamic acid-based compound has a terminal skeleton containing a carboxyl group.

The first polyamic acid-based compound which has a terminal skeleton containing a carboxyl group can be produced by using, in the reaction of the tetracarboxylic dianhydride and the diamine noted above, the tetracarboxylic dianhydride in an amount larger than the amount of the diamine (for example, in a molar amount 1.1 to 1.5 times larger than the amount of the diamine).

The first polyamic acid-based compound which has an terminal skeleton containing a carboxyl group can promote imidization at the time of baking for imidization by the carboxyl group.

[Second Polyamic Acid-Based Compound]

In another embodiment, the varnish further comprises a second polyamic acid-based compound which is a polyamic acid or a polyamic acid ester, in addition to the first polyamic acid-based compound. In this case, the first polyamic acid-based compound has a polarity higher than, or a surface energy higher than, that of the second polyamic acid-based compound. Therefore, in the case where the first and second polyamic acid-based compounds coexist in the varnish, they are phase-separated from each other. Here, the first polyamic acid-based compound has a higher affinity for indium tin oxide (ITO) which forms pixel electrodes, inorganic passivation films such as $SiO_2$ or $SiN_x$ and organic passivation films using organic resins in a liquid crystal display device. Thus, the first polyamic acid-based compound forms a lower layer. Ordinarily, in the case where a polyamic acid ester and a polyamic acid coexist, the polyamic acid ester forms an upper layer, and the polyamic acid forms a lower layer. Further, in the case where two kinds of polyamic acid-based compounds coexist, the diamine skeleton of one of these polyamic acid-based compounds contains oxygen or fluorine, the diamine skeleton of the other polyamic acid-based compound contains neither oxygen nor fluorine or the diamine skeleton of the above other polyamic acid-based compound contains oxygen or fluorine, the amount of which is, however, less than that of the oxygen or fluorine in the diamine skeleton of the above one of the polyamic acid-based compounds, the above one of the polyamic acid-based compounds forms a lower layer, and the other polyamic acid-based compound forms an upper layer.

Needless to say, in the case where the alignment film is of a single layer, the first polyamic acid-based compound is used as the polyamic acid-based compound.

The second polyamic acid-based compound can be selected from the compounds indicated above as the first polyamic acid-based compound. Alternatively, it can be selected from polyamic acid-based compounds each of which has not yet subjected to the capping of terminal primary amino groups for the production of the first polyamic acid-based compound, i.e., from polyamic acids and polyamic acid esters, each having primary amino groups at the both terminals. However, it is preferable that the second polyamic acid-based compound, as well as the first polyamic acid-based compound, have no primary amino groups at its both terminals. Also, it is preferable that neither the first polyamic acid-based compound nor the second polyamic acid-based compound has a secondary amino group (excluding a secondary amino group forming an amide), regardless of whether the alignment film has a single-layer structure or a two-layer structure.

As is clear from the above explanation, with respect to the alignment film having a two-layer structure, a lower layer means a layer which is in direct contact with an item (for example, an ITO film, an inorganic passivation film or an organic passivation film) to which the varnish is applied, and an upper layer means a layer which is in contact with the lower layer.

In the alignment film having a two-layer structure, the first polyamic acid-based compound, which has a higher polarity, is included in the lower layer and contacts with pixel electrodes. That is, in order to suppress a DC afterimage, it is necessary to prevent accumulation of charge due to the photo-charge of the lower-layer film. Therefore, it is preferable that the first polyamic acid-based compound contained at least in the lower-layer film have no primary amino groups at its both terminals.

The varnish according to some embodiments can use as solvents for dissolving or dispersing the polyamic acid-based compound or compounds, N,N-dimethylformamide, N,N-dimethylacetamide, N-methyl-2-pyrrolidone, N-methylcaprolactam, 2-pyrrolidone, M-ethylpyrrolidone, N-vinylpyrrolidone, dimethylsulfoxide, tetramehylurea, pyridine, dimethylsulfone, hexamethylsulfoxide, γ-butyrolactone, 1,3-dimethyl-imidazolidinone, ethylamylketone, methylnonylketone, methylethylketone, methylisoamylketone, methylisopropylketone, cyclohexanone, ethylene carbonate, propylene carbonate, diglyme and 4-hydroxy-4-methyl-2-pentanone.

The varnish according to some embodiments described herein is applied to an item or object to be coated, and is imidized by heating at about 200° C. More specifically, in a varnish containing, as the polyamic acid-based compound, the first polyamic acid-based compound alone, the first polyamic acid-based compound is imidized. In a varnish containing, as the polyamic acid-based compounds, both the first polyamic acid-based compound and the second polyamic acid-based compound, they are phase-separated into two layers after coating, and they are both imidized by the heating.

[Processing after Imidization]

Photo-alignment processing is carried out on the resultant imidized film, providing a photo alignment film. The photo-alignment processing can be carried out by radiating the film with a short-wavelength UV light having a wavelength of 254 or 365 nm.

The alignment film after photo alignment process (photo alignment film) may be washed using an oxidizing solvent or an organic solvent. By washing the photo alignment film, the imidization promotor remaining in the film can be removed.

Examples of the oxidizing solvent are hydrogen peroxide water, hypochlorous acid solution, ozone water, hypoiodous acid water, permanganic acid water, etc.

Examples of the organic solvent are a ketone-based solvent, an ester-based solvent, an ether-based solvent, an alcohol-based solvent, a hydrocarbon-based solvent, a halogenated hydrocarbon-based solvent, etc.

Examples of the ketone-based solvent are acetone, methylethylketone, methylisobutylketone, cyclohexanone, diacetone alcohol, etc.

Examples of the ester-based solvent are ethyl acetate, ethyl formate, methyl acetate, butyl acetate, methoxybutyl acetate, cellosolve acetate, amyl acetate, normal propyl acetate, isopropyl acetate, methyl lactate, ethyl lactate, butyl lactate, etc.

Examples of the ether-based solvent are diethyl ether, isopropyl ether, methyl cellosolve, cellosolve, butyl cellosolve, dioxane, methyl tertiary butylether (MTBE), butylcarbitol, etc.

Examples of the alcohol-based solvent are methanol, ethanol, butanol, isopropyl alcohol, normal propyl alcohol, butanediol, ethylhexanol, benzyl alcohol, etc.

Examples of the hydrocarbon-based solvent are aliphatics or aliphatic hydrocarbons such as hexane, heptane, octane, petroleum ether, ligroin, cyclohexane, and methylcyclohexane; and aromatic hydrocarbons such as benzene, toluene and xylene.

Examples of the halogenated hydrocarbon-based solvent are alkyl halides such as methylene chloride, chloroform, carbon tetrachloride and dichloroethane; alkenyl halides such as trichloroethylene and tetrachloroethylene; and aryl halides such as monochlorobenzene and dichlorobenzene.

Third Embodiment

According to the third embodiment, there is provided a liquid crystal display device comprising an alignment film comprising an imidized product of the varnish according to some embodiments.

FIG. 1 is a cross-sectional view partially illustrating a display panel PNL of a lateral electric field type liquid crystal display device.

Referring to FIG. 1, the display panel PNL includes an array substrate ARS and an opposite substrate OPS disposed opposite to, and spaced apart from, the array substrate ARS. A liquid crystal layer 300 is provided between the array substrate ARS and the opposite substrate OPS.

The array substrate ARS includes a first glass substrate 100. A gate electrode 101 is provided on the first glass substrate 100. The gate electrode 101 has the same thickness as each of scanning lines (not shown) provided on the first glass substrate 100. The gate electrode 101 can have a two-layer structure, with a lower layer, which is in direct contact with the first glass substrate 100, being formed of, for example, an AlNd alloy, and an upper layer being formed of, for example, a MoCr alloy.

A gate insulating film 102 is provided, covering the gate electrode 101. The gate insulating film 102 is formed of, for example, SiN. On the gate insulating film 102, a semiconductor layer 103 is provided at a location opposite to the gate electrode 101. The semiconductor layer 103 is formed of, for example, amorphous silicon (a-Si film). The semiconductor layer 103 forms the channel portion of a TFT (not shown). On the semiconductor layer 103, a drain electrode 104 and a source electrode 105 are provided through the above channel portion. Between the semiconductor layer 103 and the drain electrode 104 or the source electrode 105, an n$^+$-Si layer (not shown) is provided in order to establish an ohmic contact between them.

An image signal line doubles as the drain electrode 104, and the source electrode 105 is connected to a pixel electrode 110. The drain electrode 104 and the source electrode 105 are formed of, for example, a MoCr alloy.

An inorganic passivation film 106 is provided, covering the TFT. The inorganic passivation film 106 is formed of, for example, SiN. The inorganic passivation film 106 protects the TFT, especially, the channel portion thereof, from impurities. An organic passivation film 107 is provided on the inorganic passivation film 106. The organic passivation film 107 serves to protect the TFT, and also to planarize the surfaces. Therefore, the organic passivation film 107 is formed to be thick, for example, in a thickness of 1 to 4 µm. The organic passivation film is formed of, for example, "OPTMER PC Series" available from JSR Corporation.

A counter-electrode 108 is provided on the organic passivation film 107. The counter-electrode 108 is formed of a transparent electrically conductive material, for example, ITO. The counter-electrode 108 is formed planarly over the entire display area.

An interlayer insulating film 109 is provided, covering the counter-electrode 108. The interlayer insulating film 109 is formed of, for example, SiN.

A through hole 111 is provided, penetrating the interlayer insulating film 109, the counter-electrode 108, the organic passivation film 107 and the inorganic passivation film 106 to partially expose the surface of the source electrode 105.

The pixel electrode 110 is provided, covering the interlayer insulating film 109, and also covering the inner side surface and the bottom surface of the through hole 111. The pixel electrode 110 is formed of, for example, ITO. The pixel electrode 110 is connected to the portion of the source electrode 105 which is partially exposed by the through hole 111. Thus, in the through hole 111, the pixel electrode 110 and the source electrode 105, which extends from the TFT, are electrically connected to each other, and an image signal is supplied to the pixel electrode 110.

Figure 2:
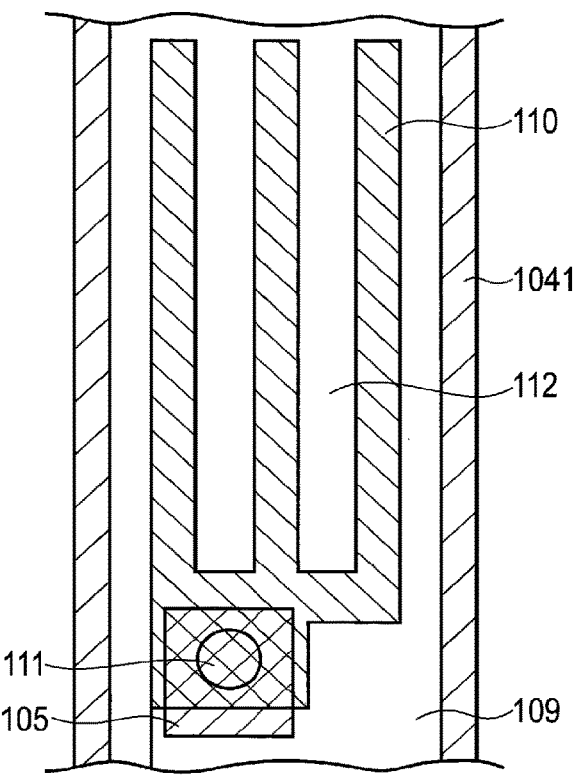
FIG. 2 is a plan view illustrating part of a pixel electrode in the liquid crystal display device shown in FIG. 1.

FIG. 2 partially illustrates an example of the pixel electrode 110. The pixel electrode 110 is a comb-tooth electrode. On both sides of the pixel electrode 110, image signal lines 1041 are provided. Slits 112 are provided between the comb-teeth of the pixel electrode 110. Also, the planar counter-electrode 108 is provided below the pixel electrode 110. When an image signal is supplied to the pixel electrode 110, liquid crystal molecules are rotated by an electric flux produced between the pixel electrode 110 and the counter-electrode 108 through the slits 112. Accordingly, light passing through the liquid crystal layer 300 is controlled to form an image.

Referring back to FIG. 1, an alignment film 113*a* which aligns liquid crystal molecules is provided on the pixel electrode 110. The construction of the alignment film 113*a* will be described later.

The opposite substrate OPS comprises a second glass substrate 200. Color filers 201 including red, green and blue filter segments are provided on the inner surface of the second glass substrate 200. Between the color filters 201, a black matrix 202 is formed, and improves the contrast of the image. The black matrix 202 also serves as a light-shielding film for the TFT, and prevents photocurrent from flowing into the TFT.

An overcoat film 203 is formed, covering the color filters 201 and the black matrix 202. The overcoat film 203 planarizes the surfaces of the color filters 201 and the black matrix 202.

An alignment film 113*b* is provided on the overcoat film 203 to cause, together with the alignment film 113*a*, the liquid crystals to be aligned in an initial alignment state. The construction of the alignment film 113*b* will be described later.

An external electrically conductive film 210 is formed on an outer surface of the second glass substrate 200 to stabilize the potential inside the liquid crystal display panel PNL. A predetermined voltage is applied to the external electrically conductive film 210.

In one embodiment, each of the alignment films 113*a* and 113*b* is a single layer film, and comprises the imidized product of the first polyamic acid-based compound. In another embodiment, each of the alignment films 113*a* and 113*b* is of a two-layer structure provided with a film comprising the imidized product of the first polyamic acid-based compound and a film comprising the imidized product of the second polyamic acid-based compound. In still another embodiment, one of the alignment films 113*a* and 113*b* is a single layer film which comprises the imidized product of the first polyamic acid-based compound, while the other alignment film is of a two-layer structure provided with a film comprising the imidized product of the first polyamic acid-based compound as the lower layer and a film comprising the imidized product of the second polyamic acid-based compound as the upper layer. The alignment films 113*a* and 113*b* will be collectively denoted as alignment film 113 hereinafter.

FIG. 3 is a schematic view illustrating the alignment film 113 having a two-layer structure according to one embodiment. In the Figure, the alignment film 113 is formed on the pixel electrode 110. The alignment film 113 is provided with an upper film 1131 and a lower film 1132. It should be noted that the boundary between the upper film 1131 and the lower film 1132 of the alignment film 113 is not clear, so the boundary is indicated by a dotted line in FIG. 3.

It is preferable that the lower layer in the alignment film having a two-layer structure occupy 30% by weight or more but 60% by weight or less of the total amount of the two-layer alignment film.

Further, it is preferable that the drive frequency (the number of times the image signal is supplied to the pixel electrodes per frame) of the liquid crystal display device fall within the range of 40 Hz or less, preferably 1 Hz or more, which leads to reduction in the power consumption. Furthermore, in the case of a low frequency driving, it is preferable that the resistance of the alignment film be high in order to suppress the lowering of the brightness during the voltage is held by the pixel electrode. The volume resistivity of the alignment film is preferably $5 \times 10^{13}$ Ωcm or more, more preferably $1 \times 10^{16}$ Ωcm or less, most preferably $5 \times 10^{15}$ Ωcm or less.

EXAMPLES

Some Examples will be described below, but firstly Synthetic Examples of polyamic acid-based compounds will be described.

Synthetic Example 1

A solution of 100 parts by mol of 1,3-dimethyl-1,2,3,4-cyclobutanetetracarboxylic dianhydride in N-methyl-2-pyrrolidone (NMP) and a solution of 110 parts by mol of p-phenylenediamine in NMP were mixed together, and the mixture was reacted at room temperature for 8 hours, producing a polyamic acid having primary amines at its both terminals. To the reaction mixture, 100 parts by mol of N,N-dimethylformamide dimethyl acetal were added dropwise, and the mixture was reacted at 50° C. for 2 hours, methyl-esterifying the two carboxyl groups in each acid skeleton. To the resulting reaction mixture, a solution of 5 parts by mol of phthalic anhydride in NMP was added, and the mixture was reacted at room temperature for 8 hours, capping the primary amino groups at the both terminals of the polyamic acid into amic acids. The unreacted monomers and low-molecular-weight components were removed, giving a solution of a desired polyamic acid ester having both terminals capped and a solids concentration of 15% by mass.

Synthetic Example 2

A solution of 100 parts by mol of pyromellitic dianhydride in NMP and a solution of 110 parts by mol of 4,4'-diaminodiphenyl ether in NMP were mixed together, and the mixture was reacted at room temperature for 8 hours, producing a polyamic acid having primary amines at its both terminals. To the reaction mixture, a solution of 5 parts by mol of phthalic anhydride in NMP was added, and reacted at room temperature for 8 hours, capping the primary amino groups at both terminals of the polyamic acid into amic acids. The unreacted monomers and low-molecular-weight components were removed, giving a polyamic acid solution having a solids concentration of 15% by mass.

Synthetic Example 3

The same procedures were taken as in Synthetic Example 1 except that 4-[(4-aminophenyl)methyl]aniline was used instead of p-phenylenediamine, giving a solution of a polyamic acid having the primary amino groups at both terminals amidated.

Synthetic Example 4

A solution of 100 parts by mol of 1,3-dimethyl-1,2,3,4-cyclobutanetetracarboxylic dianhydride in NMP and a solution of 90 parts by mol of p-phenylenediamine in NMP were mixed together, and the mixture was reacted at room temperature for 8 hours, producing a polyamic acid having carboxyl groups at its both terminals. The unreacted monomers and low-molecular-weight components were removed, giving a polyamic acid solution having a solids concentration of 15% by mass.

Synthetic Example 5

A solution of 100 parts by mol of pyromellitic dianhydride in NMP and a solution of 90 parts by mol of 4,4'-diaminodiphenyl ether in NMP were mixed together, and the mixture was reacted with at room temperature for 8 hours, producing a polyamic acid having carboxyl groups at its both terminals. The unreacted monomers and low-molecular-weight components were removed, giving a polyamic acid solution having a solids concentration of 15% by mass.

Synthetic Example 6

The same procedures were taken as in Synthetic Example 1 except that a diamine represented by Formula (G) above was used instead of p-phenylenediamine, giving a solution of a polyamic acid having the primary amino groups at both terminals amidated.

Synthetic Example 7

The same procedures were taken as in Synthetic Example 1 except that a diamine represented by Formula (F) above was used instead of p-phenylenediamine, giving a solution of a polyamic acid having the primary amino groups at both terminals amidated.

Synthetic Example 8

The same procedures were taken as in Synthetic Example 1 except that a diamine represented by Formula (H) below was used instead of p-phenylenediamine, giving a solution of a polyamic acid having the primary amino groups at both terminals amidated:

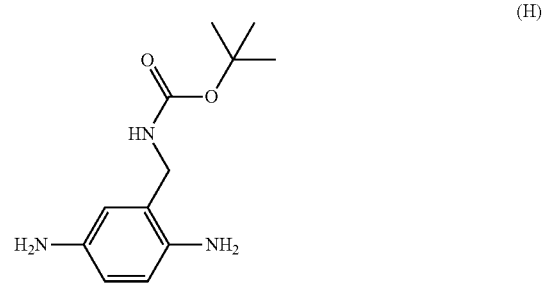 [SMILES: CC(C)(C)OC(=O)NCc1cc(N)ccc1N]

(H)

The acid skeletons, diamine skeletons and terminal skeletons of the polyamic acid-based compounds produced in Synthetic Examples 1 to 8 noted above are shown in Table 1 below. In Table 1, the mark "*" added to an acid skeleton represents a binding site to the amine skeleton, and the mark "*" added to an amine skeleton represents a binding site to the acid skeleton. The mark "*" added to the terminal skeleton represents a binding site to the acid skeleton if the terminal skeletons have amides and represents a binding site to the amine skeleton if the terminal skeletons have carboxyl groups.

TABLE 1

| Synthetic Example | Acid skeleton | Diamine skeleton |
|---|---|---|
| 1 | (structure) | (structure) |

TABLE 1-continued
| | | |
|---|---|---|
| 2 | 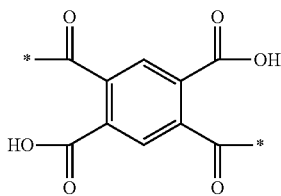 | 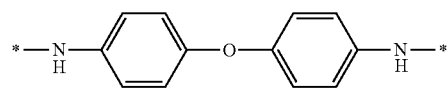 |
| 3 | 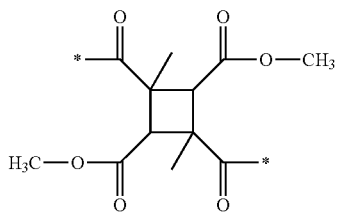 | 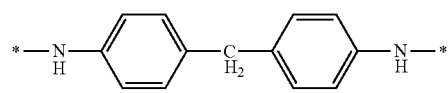 |
| 4 | 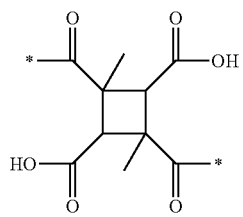 | 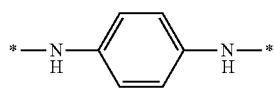 |
| 5 | 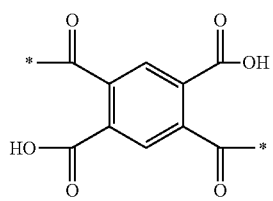 | 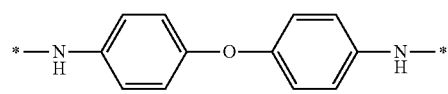 |
| 6 | 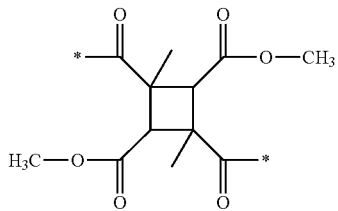 | 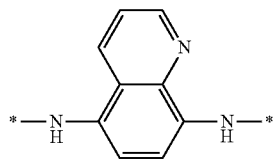 |
| 7 | 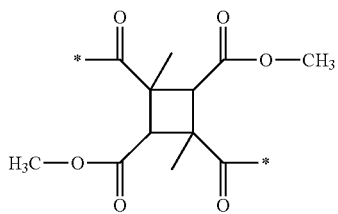 | 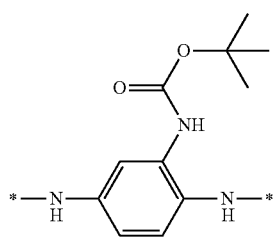 |
| 8 | 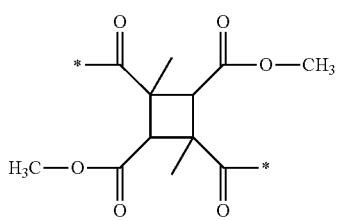 | 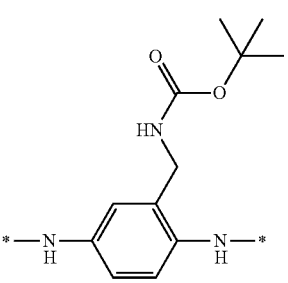 |

TABLE 1-continued

| Synthetic Example | Each terminal skeleton |
|---|---|
| 1 | *—NH—C6H3(NH)—C(O)—C6H4—COOH (2-carboxybenzamide on 1,4-diaminobenzene, ortho) |
| 2 | *—NH—C6H4—NH—C(O)—C6H4—COOH |
| 3 | *—NH—C6H4—CH2—C6H4—NH—C(O)—C6H4—COOH |
| 4 | *—C(O)— dimethylcyclobutane tricarboxylic acid |
| 5 | *—C(O)— benzene tricarboxylic acid (pyromellitic-type) |
| 6 | *—NH—(quinolin-5,8-diyl)—NH—C(O)—C6H4—COOH<br>or<br>*—NH—(quinolin-8,5-diyl)—NH—C(O)—C6H4—COOH |

TABLE 1-continued

7
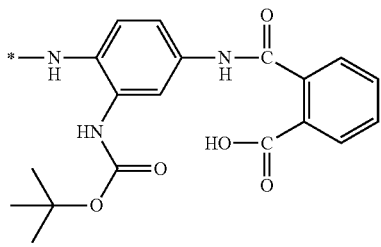

or

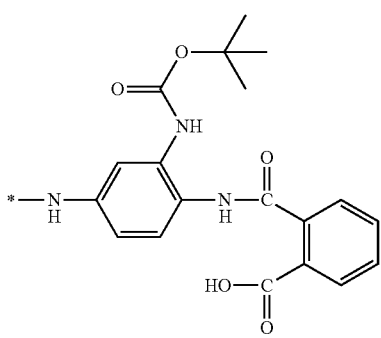

8
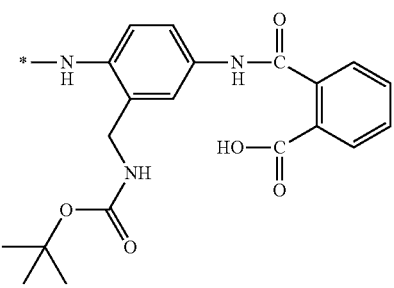

or

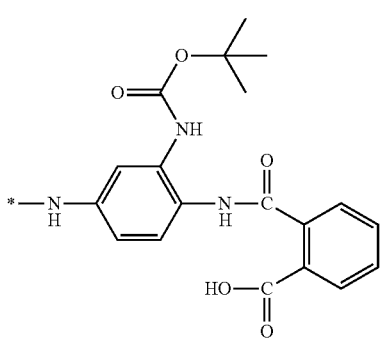

Examples 1 to 10 and Comparative Examples 1 to 4

Coating liquids were prepared by adding, to the polyamic acid-based compounds of Examples 1 to 10 and Comparative Examples 1 to 4 shown in Table 2 below, the imidization promotors, respectively as indicated in the table (note in some cases, no promotor is added), followed by agitation for homogenization, and then mixing the upper-layer components and lower-layer components at the mass ratio of 1:1. In the liquid crystal display device having the structure as illustrated in FIG. 1, the coating liquids were applied to the areas of the array substrate and the opposite substrate, which were to be coated with alignment films 113, and were imidized by heating at 200° C. The imidization degree in all the Examples was 80%. Photo-alignment processing was conducted on each of the resultant imidized films using short wavelength UV light. Then, the alignment films were washed. Thus, the liquid crystal display devices provided with the display panels having the structure as illustrated in FIG. 1 were fabricated by the ordinary method, using array substrates and opposite substrates provided with alignment films thus formed. A nematic liquid crystal material (MLC-2039 available from Merk & Co., Inc.) having negative dielectric anisotropy Δε the value of which was −4.1 (1 kHz, 20° C.) and refractive anisotropy Δn the value of which was 0.0821 (wavelength of 590 nm, 20° C.) was used as the liquid crystal.

The fabricated liquid crystal display devices were operated to display a white and black (shaded) checkered flag pattern as illustrated in FIG. 4 for 100 hours. Each of checkers forming the checkered flag pattern was a square having four sides of equal length of 5 mm. White is the maximum luminance (256th level of 256 levels of gray), and black is the minimum luminance (0th level of 256 levels of gray). Then, when the liquid crystal display devices were each operated to display gray at the 31st level of 256 levels of gray on the entire screen of each liquid crystal display device, it was observed that the areas corresponding to the white checkers which had displayed white for 100 hours exhibited luminance different from that of the areas corresponding to the black checkers which had displayed black for 100 hours. The change rate of the luminance of the both areas noted above is calculated by the following formula:

{(a−b)/b}×100 where a is the luminance of the areas corresponding to the white checkers which had displayed white for 100 hours, and b is the luminance of the areas corresponding to the black checkers which had displayed black for 100 hours. The change rate is defined as the intensity of afterimage. If a numeral value obtained by the above formula is greater than or equal to 1%, afterimage is recognized by human's eyes.

The change of the afterimage intensity over time was measured when the gray was displayed after the checkered flag pattern was continuously displayed for 100 hours, and was evaluated on a scale in 5 levels below.

A: No afterimage generated from the initial stage of the above gray-displaying operation.

B: An afterimage slightly visible from an oblique direction, generated at the initial stage of the gray-displaying operation, but disappeared within one hour.

C: An afterimage visible from a front view, generated at the initial stage of the gray-displaying operation, but disappeared within one hour.

D: An afterimage visible from a front view, generated at the initial stage of the gray-displaying operation, and reduced to an afterimage slightly visible from an oblique direction after one hour.

E: An afterimage visible from a front view, generated at the initial stage of the gray-displaying operation, but did not disappear even after one hour.

Furthermore, the fabricated liquid crystal display devices were operated to display 10 different kinds of patterns for 1,000 hours in a thermostatic bath at 70° C. while switching the patterns one from another every 30 seconds. The liquid crystal displays were taken out of the thermostatic bath every 250 hours and operated to display a gray pattern (64th level of 256 levels of gray) in normal temperature environment. In each device, the entire area of the screen was observed as to whether nonuniformity had occurred, and evaluated on a scale of five levels below.

A: Nonuniformity in display not generated even after 1,000 hours.

B: A nonuniformity not generated before 750 hours, but after 1,000 hours, a small nonuniformity in brightness (nonuniformity in display) of 1 mm or less in diameter occurred on a part of the screen, which corresponds to the outer circumference of the substrate.

C: A nonuniformity not generated before 500 hours, but after 1,000 hours, a nonuniformity in brightness of 1 mm or more in diameter, which is visible at first sight, occurred on a part of the screen, which corresponds to the outer circumference of the substrate.

D: A small nonuniformity in brightness of 1 mm or less in diameter occurred on a part of the screen, which corresponds to the outer circumference of the substrate before 500 hours.

E: A nonuniformity in brightness of 1 mm or more in diameter, which is visible at first sight, occurred on a part of the screen, which corresponds to the outer circumference of the substrate before 500 hours.

The results are indicated in Table 2. Note that Table 2 indicate briefly the skeletons at both terminals in the polyamic acid-based compounds produced in the Synthetic Examples.

TABLE 2

|  | | Polyamic acid-based compound | Terminal skeleton | Imidization promotor | DC afterimage | Nonuniformity in display |
|---|---|---|---|---|---|---|
| Ex. 1 | Upper layer component | Synthetic Ex. 1 | Amide | N,N-dimethyl-4-aminopyridine | B | B |
|  | Lower layer component | Synthetic Ex. 2 | Amide | | | |
| Ex. 2 | Upper layer component | Synthetic Ex. 3 | Amide | β-picoline | B | C |
|  | Lower layer component | Synthetic Ex. 2 | Amide | | | |
| Ex. 3 | Upper layer component | Synthetic Ex. 1 | Amide | Nicotinic acid | A | B |
|  | Lower layer component | Synthetic Ex. 2 | Amide | | | |
| Ex. 4 | Upper layer component | Synthetic Ex. 1 | Amide | 2,2'-dipyridyl | B | A |
|  | Lower layer component | Synthetic Ex. 2 | Amide | | | |
| Ex. 5 | Upper layer component | Synthetic Ex. 1 | Amide | 2,6-dimethylquinoline | B | A |
|  | Lower layer component | Synthetic Ex. 2 | Amide | | | |
| Ex. 6 | Upper layer component | Synthetic Ex. 1 | Amide | 5-butylpicolinic acid | A | A |
|  | Lower layer component | Synthetic Ex. 2 | Amide | | | |

TABLE 2-continued

|  |  | Polyamic acid-based compound | Terminal skeleton | Imidization promotor | DC afterimage | Nonuniformity in display |
|---|---|---|---|---|---|---|
| Ex. 7 | Upper layer component | Synthetic Ex. 4 | Carboxylic acid | Absent | C | A |
|  | Lower layer component | Synthetic Ex. 5 | Carboxylic acid |  |  |  |
| Ex. 8 | Upper layer component | Synthetic Ex. 1 | Amide | Absent | C | A |
|  | Lower layer component | Synthetic Ex. 5 | Carboxylic acid |  |  |  |
| Ex. 9 | Upper layer component | Synthetic Ex. 6 | Amide | Absent | B | A |
|  | Lower layer component | Synthetic Ex. 2 | Amide |  |  |  |
| Ex. 10 | Upper layer component | Synthetic Ex. 7 | Amide | Absent | C | A |
|  | Lower layer component | Synthetic Ex. 5 | Carboxylic acid |  |  |  |
| Comp. Ex. 1 | Upper layer component | Synthetic Ex. 3 | Amide | 4-aminopyridine | E | C |
|  | Lower layer component | Synthetic Ex. 2 | Amide |  |  |  |
| Comp. Ex. 2 | Upper layer component | Synthetic Ex. 1 | Amide | Histidine | E | A |
|  | Lower layer component | Synthetic Ex. 2 | Amide |  |  |  |
| Comp. Ex. 3 | Upper layer component | Synthetic Ex. 1 | Amide | Absent | E | A |
|  | Lower layer component | Synthetic Ex. 2 | Amide |  |  |  |
| Comp. Ex. 4 | Upper layer component | Synthetic Ex. 8 | Amide | Absent | E | A |
|  | Lower layer component | Synthetic Ex. 2 | Carboxylic acid |  |  |  |

As described in detail above, according to one or more embodiments described above, a varnish for producing photo alignment films is provided, which does not cause a DC afterimage on a liquid crystal display device or causes an DC afterimage to disappear in a short period of time even if the DC afterimage is generated, and also a liquid crystal display device is provided, in which a DC afterimage is not generated or disappears within a short period of time even if the afterimage is generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a lateral electric field type liquid crystal display comprising:
   a step of forming a pixel electrode and a counter electrode over a substrate; and
   a step of forming a photo alignment film by imidizing a varnish formed over the pixel electrode and the counter electrode, and by radiating with UV light
   wherein the varnish comprises an organic solvent, a first polyamic acid-based compound, and an imidization promotor for promoting dehydration and cyclization reaction to the first polyamic acid-based compound, the first polyamic acid-based compound being a polyamic acid or a polyamic acid ester,
   wherein
   the imidization promotor has skeleton containing neither a primary amino group nor a secondary amino group,
   the imidization promotor is a pyridine-based compound, a quinoline-based compound, an isoquinoline-based compound, an imidazole-based compound, a benzimidazole-based compound or a tertiary amine, and
   the first polyamic acid-based compound has terminal skeletons containing no primary amino group.

2. The method according to claim 1, wherein the imidization promotor comprises an amine-reactive skeleton.

3. The method according to claim 2, wherein the amine-reactive skeleton comprises a halogen group, a diazo group, a carboxyl group, a hydroxyl group, an isocyanate group or an acid anhydride skeleton.

4. The method according to claim 1, wherein the imidization promotor has a molecular weight of 130 or more.

5. The method according to claim 1, wherein the first polyamic acid-based compound has a structural unit represented by Formula (1) below:

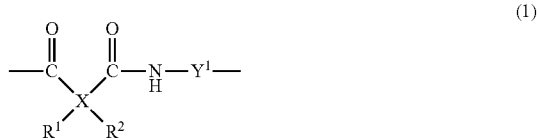

(1)

where X is a cyclic group, each of $R^1$ and $R^2$ is independently —COOH or —COOR where R is an alkyl group, and $Y^1$ is an organic group.

6. The method according to claim 1, wherein the first polyamic acid-based compound has an acid skeleton represented by Formula (2) below:

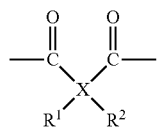 (2)

where X is a cyclic group, and each of $R^1$ and $R^2$ is independently —COOH or —COOR where R is an alkyl group.

7. The method according to claim 1, wherein the terminal skeletons comprise an imide skeleton, an amide skeleton, an urea skeleton, a tertiary amino skeleton, an azo bond or a carboxyl group.

8. The method according to claim 1, wherein the varnish further comprises a second polyamic acid-based compound, which is a polyamic acid or a polyamic acid ester, and the first polyamic acid-based compound has a polarity higher than that of the second polyamic acid-based compound.

9. The method according to claim 1, further comprising a step of washing the formed photo alignment film with an organic solvent or an oxidizing solvent.

\* \* \* \* \*